Nov. 1, 1949. G. W. NIGG ET AL 2,486,670
STUD FOR COWL FASTENERS
Filed Dec. 20, 1943 2 Sheets-Sheet 1
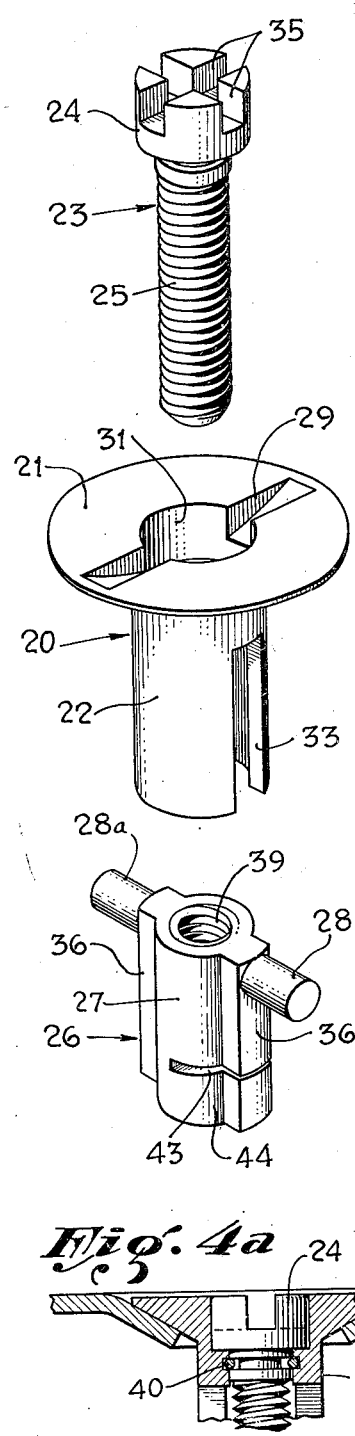
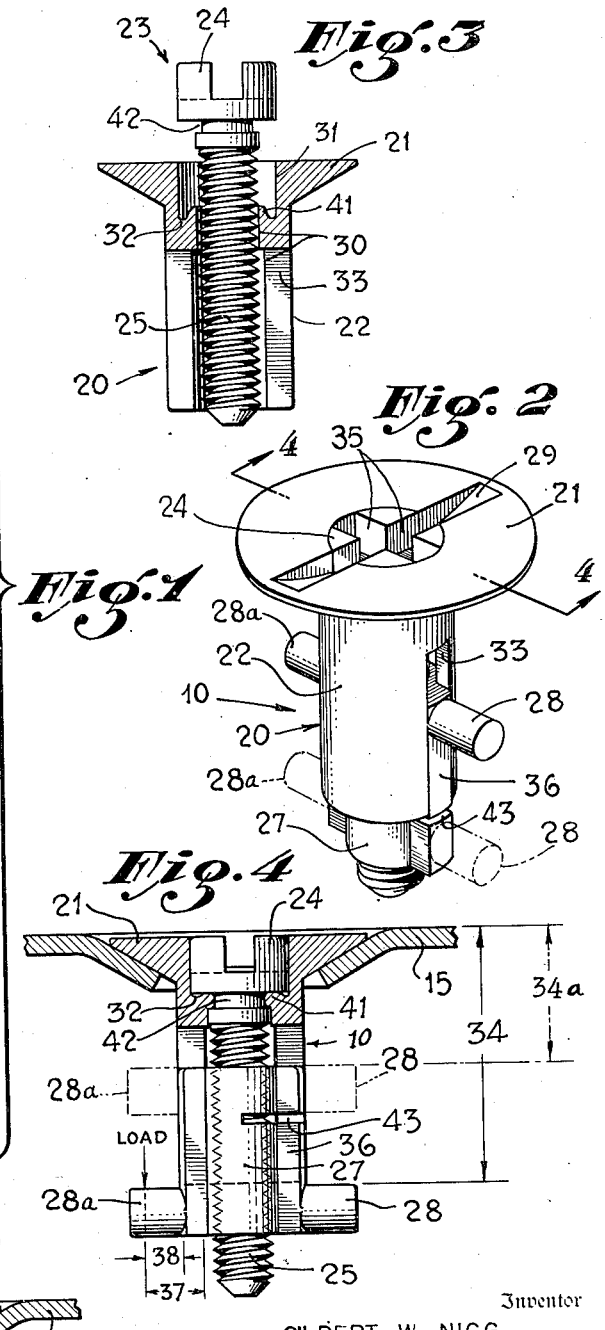
Inventor
GILBERT W NIGG
GEORGE C SULLIVAN
By George C Sullivan
Attorney

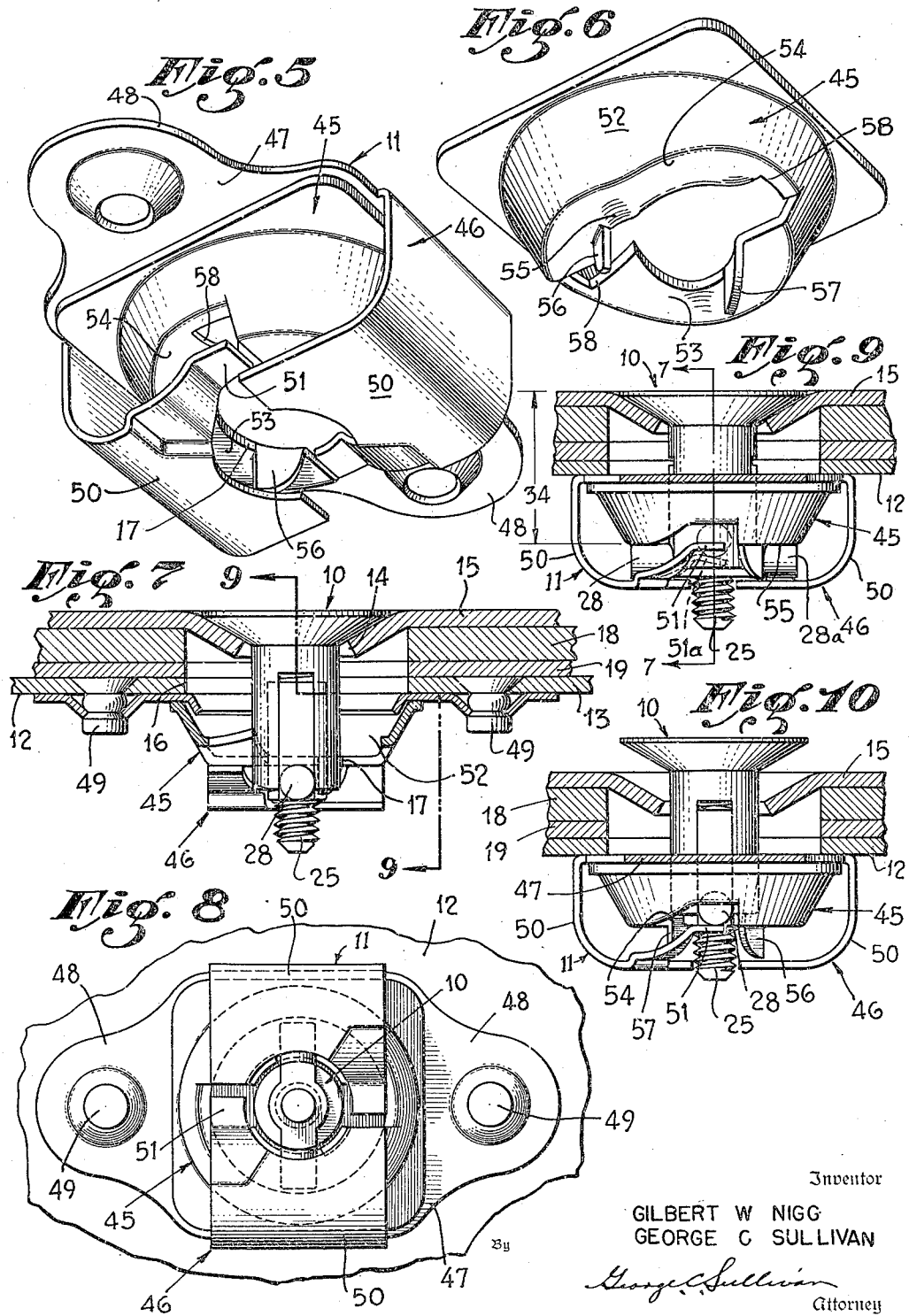

Patented Nov. 1, 1949

2,486,670

UNITED STATES PATENT OFFICE 2,486,670

STUD FOR COWL FASTENERS

Gilbert W. Nigg, Covina, and George C. Sullivan, Hollywood, Calif., assignors to Nigg Engineering Company, Covina, Calif.

Application December 20, 1943, Serial No. 515,006

6 Claims. (Cl. 24—221)

This invention relates to improvements in fastening devices wherein such devices are particularly adaptable to the securing of two or more plate-like materials together, such as for example, relatively thin sheets of metal, plastic, wood or the like as are commonly used in the construction of aircraft and components thereof.

The invention relates to detachable fasteners of the general type disclosed in United States Patent No. 2,307,004 to Murphy, which fastener is primarily designed to secure parts, particularly sheet metal parts, together. The device is so constructed that the sheets or plates are drawn together on rotation of one part of the device relative to the other.

The general object of our invention is to provide a fastener device of simple and economic construction, which device comprises essentially a rotary stud member to be attached to one of the sheets and a receptacle member to be attached to one other of the sheets to be secured together. The receptacle member provides a support for lateral extensions protruding from the stud member in such a manner that upon entry of the stud member within the receptacle member and upon rotary movement of said stud member with respect to said receptacle member, the extensions will contact the faces of the receptacle member and thus draw the sheets together in a secured relationship, such action being caused by the cammed surfaces which form the faces of the receptacle. The faces of the receptacle member may be constructed in such a manner that such faces will spring a small amount in order to allow for presently used manufacturing tolerances. The receptacle member is so designed as to provide automatic ejection of the stud member when the two parts are not in locked position. The faces of the receptacle member are designed with the necessary stops to limit and control movement of the parts whereby the operator can be advised as to whether or not the stud is in a locked or unlocked position.

A primary object of our invention is to provide a fastener device which is practical and very effective when used in applications wherein the total thickness of the sheets to be secured is variable. Present devices ordinarily require a multiplicity of sizes of rotary or stud members in order to have a device which will work effectively for any one of the many variations of total thickness of sheets encountered in practice. Our invention discloses a construction of a single stud member which may be adjusted to fit any combination of sheets as may be encountered in typical present-day construction.

It is a very important object of the present invention to provide a construction of stud member which is adjustable in length from the outside of the installation, this being particularly desirable in that each individual device may be adjusted without interfering with other fasteners in its general locality. It is understood that adjustable studs have been recently constructed in which adjustment is made from the inside of the installation. This is inconvenient and impractical in that to adjust, repair or replace one stud, all of the other studs installed on the removable panel must be unlocked, in order to remove the panel to obtain access to the rear of the stud to be adjusted. Our invention eliminates this disadvantageous feature.

Another important object is to provide a detail construction of rotary stud member which permits the stud to carry exceptionally high loads without failing structurally. This feature is accomplished by ingenious means which have been invented and discovered as a result of long and extended research and testing experience.

Another important object of the invention is to provide in the design of the stud unit, a construction which permits a maximum range of adjustment for a minimum length of stud unit.

Other and further important objects of this invention will be apparent from the disclosures in the specification and the accompanying drawings.

This invention, in its preferred form, is illustrated in the drawings and hereinafter more fully described.

In the drawings—

Figure 1 is a perspective view of the rotary member or stud expanded in a manner to show its three major components;

Figure 2 is a perspective view of the stud device with its three components in working relationship;

Figure 3 is a sectional view of the stud showing the manner in which the threaded element is inserted within the sleeve element;

Figure 4 is a section taken along the line 4—4 of Figure 2 with the exception that the nut element has been reversed;

Figure 4a is a section similar to Figure 4 showing a typical means of securing the threaded element to the sleeve element;

Figure 5 is a perspective view of the receptacle member, such receptacle member being illustrated as a flush-mounted type;

Figure 6 is a perspective view of the inner portion of the receptacle member, such inner portion showing its cammed locking surface and stops;

Figure 7 is a section view taken along the line 7—7 of Figure 9 of the receptacle member and stud member associated in such a manner that they securely fasten sheets together;

Figure 8 is a rear view of the installation shown in Figure 7;

Figure 9 is a sectional view taken along the line 9—9 of Figure 7 showing the installation in secured or fastened position.

Figure 10 is a sectional view taken along the line 9—9 of Figure 7 showing the installation in unfastened position.

The preferred fastener device chosen for illustrative purposes may be said to comprise generally a stud member 10 and a receptacle member 11. The receptacle member 11 is secured to a surface 12 of an inner sheet 13 which forms a part of the sheet combination, while the stud member 10 is mounted through an opening 14 in the outer sheet 15. Both the stud member 10 and the receptacle member 11 are shown in the drawings to be of the flush type, i. e., these members are designed for mounting in such a manner that there are no protrusions above the outside surfaces of the inner sheet 13 and outer sheet 15. The inner sheet 13 has an opening 16 therein to permit the stud member 10 to enter the opening or aperture 17 in the receptacle member 11. Any number of additional sheets 18 and 19 with varying thicknesses may be inserted between the inner sheet 13 and the outer sheet 15, if provided with openings of sufficient size that the stud member 10 may pass through and engage the receptacle member 11.

Referring in detail to the construction of the stud member 10, the member comprises a sleeve element 20 having a preferably integral head portion 21 which is larger in diameter than the opening 14 and a shank portion 22 which is smaller in diameter than the opening 17 in the receptacle member 11, a threaded element 23 having a head portion 24 and a shank portion 25, and a nut element 26 having a shank portion 27 and a lateral projection or extensions 28 and 28a.

The sleeve element 20 has a slot 29 to receive a tool by which the stud member may be rotated. The sleeve element 20 has a bore 30 running axially therethrough, and also has a counterbore 31 in the head portion 21 to form a base 32 upon which the head portion 24 may rest. The shank portion 22 has a transverse slot 33 formed therein to permit the extensions 28 and 28a to move up and down and thus adjust the workable length of the stud member 10, i. e., the distance between the head portion 21 and the lateral extensions 28 and 28a as illustrated by 34 and 34a.

The threaded element 23 has in its head portion 24 a cross-slot 35 each of which is at least as wide as the slot 29 so that an operating tool will freely enter the combined slot 29 and 35 as shown in Figure 2. The cross-slot 35 is preferred in that it will permit finer adjustments than a one-way slot.

The nut element 26 is preferably constructed with longitudinal ribs 36 which are adapted to enter and fit rather closely the slot 33 of the sleeve element 20. This construction is desirable in that such ribs make the fastener device more structurally sound, i. e., the device will carry greater loads, particularly tension loads. Referring to Figure 4, it will be seen that without the ribs 36 the leverage between the load and the shank portion 27 would be as indicated at 37 whereas with the ribbed construction the leverage would be less than 37 as may be represented by 38. Thus it is seen that the ribbed construction lowers the bending moment on the cantilevered extensions 28 and 28a, thus lowering the critical stress and making the fastener device of more value in that it will carry very high loads. We have found that by making the lateral extensions 28 and 28a integral with the stud member 10 and particularly integral with the nut element 26 that additional strength may be obtained over the type wherein the lateral extensions are constructed in the shape of a pin which is press-fitted into a hole in the stud unit. The latter construction is typically shown and described in U. S. Patent No. 2,307,004 issued to Murphy.

The nut element 26 has an axial bore 39 which is threaded to correspond to the shank 25 of the threaded element 23. The nut element 26 is preferably constructed so that it may be screwed on the threaded element from either end, thus making the unit of value in that the working distance, i. e., the distance between the extended positions of the lateral extensions 28 and 28a as shown by the numerals 34 and 34a, is increased substantially. This reversability feature is very advantageous and is made possible with the use of a relatively short shank 22, by constructing the lateral extensions 28 and 28a at or near one end of the nut element 26 and by providing the shank 27 of the nut element 26 with ribs 36. Without the ribs 36 the extensions 28 and 28a, in extended stud position, would pass beyond the lower end of the shank 22 and would thus rotate and not fasten when rotary movement is applied to the head of the stud unit by use of slots 29.

It has been found desirable to lock in some manner, the threaded element 23 in relation to the sleeve element 20. Various means have been proposed and tried, such as for instance, the use of a small snap lock ring 40 between the two elements as shown in Figure 4a. However, it has been found particularly useful and desirable for production reasons to lock such parts by means of a swaging operation such as is shown in Figure 4. To this end, the sleeve element 20 has a circumferential protrusion 41 (see Figure 3) which is so constructed that when the threaded element 23 is inserted into the bore 31 and is forced down under pressure, the protrusion 41 is swaged over until it substantially fills the radial groove 42 in the threaded element 23. Thus it is seen that this method of securing these elements together is a simple, accurate and desirable production operation. Without such or a similar locking means the nut element 26 and threaded element 23 would be able to slide up and down within the bores 31 and 30 when the fastener device was in an unfastened position, all of which is not desired in a fastener device of this kind.

From the foregoing it is evident that the three major components of the stud member 10, i. e., the sleeve element 20, the threaded element 23 and the nut element 26, form a combination which is flexible and allows for the adjustment of the length of the stud, the critical length being the distance as represented by the numeral 34 and 34a. For any one total sheet thickness combination, it is apparent that by advancing or retracting the threaded element 23, the nut element 26 will follow accordingly and thus the fastener will be adjusted to the desired length necessary to secure the sheets firmly together. Once this adjustment is made, it is desirable that the fastener device be so constructed that due to vibration and the like it will not work out of adjustment. To that end, the nut element 26 is provided with a slot 43 which, after the element is threaded, permits the lower portion 44 to be swaged down thus forcing the screw threads in that portion to be out of alignment with those of the remaining portion of the nut element 26. This operation puts a frictional resistance in the threads between the nut element 26 and the threaded element 23 which provides a frictional resistance means to prevent the device from working out of adjustment. Additional friction is obtained in the close fit between the head portions 21 and 24 and in the swaging operation forcing the protrusion 41 into the radial groove 42.

Referring in detail to the construction of the receptacle member 11 it may be stated that such member is preferably constructed of two pieces of spring metal, the two pieces being of different gauge for reasons hereinafter to be disclosed. The receptacle in preferred form has an inner load-carrying element 45 and an outer base and spring ejector element 46, the latter having an elongated base element 47 with tapered portions 48 adapted to be secured to the inner sheet 13 by means of rivets 49 or equivalent attaching means. Integral wings 50 are bent around in a U-shape to provide ejector means 51 which, due to spring action as shown by 51a in Figure 9, automatically ejects the stud member 10 from the receptacle member 11, as is shown by Figure 10.

The load-carrying element 45 (see Figure 6) is preferably constructed so as to fit within the spring ejector element 46 as is shown in Figure 5. A certain amount of space or play may be incorporated between the elements 45 and 46, which play (see Figure 9) permits element 45 to move with respect to the element 46 and thus produce a self-aligning feature. The element 45 is constructed with a frusto-conical portion 52 to permit the stud member 10, particularly the shank 22 and lateral extensions 28 and 28a, to lie within the concave portion 52, thus permitting the inner sheet 13 and outer sheet 15 to be flat even when the fastener device is not fastened. This is shown in Figure 10. The load-carrying element 45 is provided, around its inner periphery 53, with a cammed locking surface 54 having a drop 55 into which the lateral extensions 28 and 28a can be guided to lock the device in a fastened position. The drop 55 is not essential but may be found to be preferable. Stops 56 and 57 limit the rotary action of the stud member 10 with respect to the receptacle member 11. Slots 58 are constructed within the inner periphery 53 to allow the lateral extensions 28 and 28a to enter the receptacle 11 into such a position that it may be rotated into a fastened position.

We preferably construct the receptacle member 11 in two pieces for several reasons, one being ease of production and another being for satisfactory ejecting reasons. Inasmuch as the element 45 carries the major structural loads inserted upon the fastener device, it is required to be constructed of a somewhat heavy gauge of material. If the wings 50, being of integral structure, were made of this heavy gauge material, the ejector 51 would be too stiff and thus disadvantageous. Accordingly, by making the spring ejector element 46 and the integral ejector means 51 out of lighter gauge material we obtain the correct ejecting, and incidentally inserting, force. A third reason is to permit play between the two elements and thus obtain the self-aligning feature as described hereinbefore. A fourth reason for using two gauges of material is that by so doing we are able to reduce the weight of the receptacle member 11 as a whole, this feature being particularly important when the fastener device is contemplated for use on aircraft.

It may be well to summarize the operation of the fastener device. In order to fasten the inner sheet 13 to the outer sheet 15 with no or a limited number of additional sheets therebetween, the stud member 10 is inserted within the opening 16 of the inner sheet 13 and into the opening 17 and portion 52 of the receptacle member 11. By means of a suitable tool, such as a screwdriver, coin or the like, inserted within the slot 29, a rotary movement in a clock-wise direction will align the lateral extensions 28 and 28a with the slots 58 thus allowing the stud member 10 to be inserted further into the receptacle member 11 into a position that upon additional rotational movement of the stud member 10, the lateral extensions 28 and 28a will ride upon the cammed surface 54 until it is forced against the stops 56 and 57 and into the drop 55 whereupon it arrives into its locked losition. During this latter action, the inner sheet 13 and outer sheet 15 are being drawn securely together. The parts of the fastener device may be unlocked or unfastened by rotating the stud member 10 in a reverse direction. As the lateral projections 28 and 28a approach and align the slots 58, the ejector means 51 forces the stud member 10 out of engagement. This is advantageous in that, due to the stud head portion 21 protruding above the outer sheet 15, it acts as a visual indicator telling the operator that the fastener device is unfastened.

It will be readily seen that the length 34 and 34a is particularly critical, for in order to securely fasten the sheets together, only one length 34 or 34a is correct for any particular total sheet combination. Not only do we find in practice that there is an infinite number of sheet combinations, but we also find that the various sheets may become battered up to such a degree that the will not lie flat against each other, thus making it all the more desirable to have a single stud member which is capable of adjustment in length to fit correctly any combination of sheets to be secured. Our invention accomplishes this advantageous function in a simple, inexpensive and desirable manner.

Thus it will be seen that we have produced not only a very practical workable fastener combination, but have disclosed a construction of stud unit which is particularly desirable in that it will carry extremely high structural loads and at the same time is adjustable over a wide range of operation, such adjustment being accomplished from the outside of the installation or from the head portion end of the stud member.

Having described a typical form of our invention, we do not wish to be limited to the specific details herein set forth but wish to reserve to ourselves any variations or modifications that may appear to those skilled in the art or fall within the scope of the following claims.

We claim as our invention:

1. A rotary stud member for a separable fastener comprising, a shank portion having a head portion integral therewith, said shank portion having a bore and counterbore therethrough and a transverse slot therein, a threaded element positioned within said bores and attached to said shank portion, said threaded element having an adjusting head portion accessible from the head portion end of the stud member, a nut element having longitudinal ribs and lateral extensions adapted to move within said transverse slot, and a threaded connection between said nut element and said threaded element whereby said nut element and its integral lateral extensions may be adjusted longitudinally of said stud shank portion to accommodate the stud member to sheets of various thicknesses.

2. A rotary stud member for separable fastener installations comprising a hollow sleeve having head and shank portions, said shank portion being slotted transversely, a threaded element positioned within said hollow sleeve and rotatably attached thereto, said threaded element having an adjusting head portion accessible from the outside of said fastener installation, and a nut element having longitudinal ribs and lateral extensions extending through said transverse slot, said nut element being connected to said threaded element whereby said lateral extensions may be adjusted longitudinally within said hollow sleeve to accommodate the stud member to apertured sheets of various thicknesses.

3. A rotary stud member for separable fastener installations comprising a hollow sleeve having head and shank portions, said shank portion being formed with transverse slots, a threaded element positioned within said hollow sleeve and rotatably attached thereto, said threaded element having an adjusting head portion accessible from the outside of said fastener installation, and a nut element having lateral ribs which occupy said slots and which carry lateral extensions, said nut element being connected to said threaded element whereby said lateral extensions may be adjusted longitudinally with respect to said hollow sleeve to accommodate the stud member to apertured sheets of various thicknesses.

4. A stud for a rotary operative fastener of the kind described, which stud comprises in combination a head, a hollow shank, said shank being formed with an internal annular projection, a threaded sleeve within the shank having a radial arm extending therefrom, and a threaded element engaging the sleeve for positioning the radial arm with respect to the said head, said threaded element having a head and an annular shoulder adjacent said head, said head being operative to swedge said annular projection over said shoulder to rotatably attach said threaded element to said hollow shank.

5. A stud for a rotary operative fastener of the kind described, which stud comprises in combination a head, a hollow shank, said shank being formed with a protrusion, a threaded sleeve within the shank having a radial arm extending therefrom, and a threaded element engaging the sleeve for positioning the radial arm with respect to said head, said threaded element having a head and an annular shoulder adjacent said head, said head being operative to swedge said protrusion over said shoulder and in so doing rotatably attach said threaded element to said hollow shank.

6. A rotary stud member for separable fastener installations comprising a hollow sleeve having head and shank portions, said shank portion being formed with transverse slots, a threaded element positioned within said hollow sleeve and rotatably attached thereto, said threaded element having an adjusting head portion accessible from the outside of said fastener installation, and a reversible nut element having lateral ribs which occupy said slots and which carry lateral extensions located substantially closer to one end of the nut than to the other, said nut element being connected to said threaded element, whereby said lateral extensions may be adjusted axially of said hollow sleeve to accommodate the stud member to apertured sheets of various thicknesses.

GILBERT W. NIGG.
GEORGE C. SULLIVAN.

REFERENCES CITED

The following references are of record in the file of this patent:

UNITED STATES PATENTS

| Number | Name | Date |
|---|---|---|
| 1,768,505 | Carr | June 24, 1930 |
| 2,095,271 | Swanstrom | Oct. 12, 1937 |
| 2,306,928 | Bedford, Jr. | Dec. 29, 1942 |
| 2,307,004 | Murphy | Dec. 29, 1942 |
| 2,314,368 | Poupitch | Mar. 23, 1943 |
| 2,322,614 | Bedford, Jr. | June 22, 1943 |
| 2,329,909 | Johnson | Sept. 21, 1943 |

FOREIGN PATENTS

| Number | Country | Date |
|---|---|---|
| 542,028 | Great Britain | Dec. 23, 1941 |